US006944797B1

(12) United States Patent
Guthrie et al.

(10) Patent No.: US 6,944,797 B1
(45) Date of Patent: Sep. 13, 2005

(54) METHOD AND SYSTEM FOR TRACING

(75) Inventors: Scott D. Guthrie, Bellevue, WA (US); David Gutierrez, Woodinville, WA (US); Bradley D. Millington, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 09/876,689

(22) Filed: Jun. 7, 2001

(51) Int. Cl.[7] .................................................. G06F 11/00
(52) U.S. Cl. ........................................... 714/45; 717/128
(58) Field of Search ............................. 714/45, 46, 38; 717/124, 127, 128, 125, 130, 131

(56) References Cited

U.S. PATENT DOCUMENTS

| | | | |
|---|---|---|---|
| 3,937,925 | A | 2/1976 | Boothroyd |
| 3,956,615 | A | 5/1976 | Anderson et al. |
| 4,186,871 | A | 2/1980 | Anderson et al. |
| 4,807,154 | A | 2/1989 | Scully et al. |
| 4,847,785 | A | 7/1989 | Stephens |

(Continued)

FOREIGN PATENT DOCUMENTS

| | | |
|---|---|---|
| EP | 01111679 A2 | 12/2000 |
| EP | 1156415 | 11/2001 |
| EP | 1164473 | 12/2001 |
| WO | WO 98/21651 | 5/1998 |
| WO | WO 98/44695 | 10/1998 |
| WO | WO 99/34288 | 7/1999 |

OTHER PUBLICATIONS

Anderson et al., "A Preview of Active Server Pages +", Nov. 2000, Wrox Press, pp. 107–147.*

Wu, Dapeng; Hou, Yiwci Thomas: Zhang, Ya–Qin; "Scalable Video Transport over Wireless IP Networks"; IEEE 2000; pp. 1185–1191.

Dobson, Rick; "Data Binding in Dynamic HTML"; DBMS Mar. 1998 pp. 47–52.

Penn, Gerald; Hu, Jianying; Luo, Hengbin; McDonald, Ryan; "Flexible Web Document Analysis for Delivery to Narrow–Bandwidth Devices"; IEEE 2001; pp. 1074–1078.

Esposito, Dino; "Heaven Sent"; Developer Network Journal issue Mar. 23/Apr. 2001 pp. 18–24.

(Continued)

*Primary Examiner*—Scott Baderman
(74) *Attorney, Agent, or Firm*—Merchant & Gould PC

(57) ABSTRACT

A method of collecting runtime information for an application in a computing system includes locating trace statements in a source code of the application, collecting information regarding the trace statements, and outputting the information for use by a user. A system for collecting runtime information for an application in a computing system includes a locate module, a collect module, and an output module. The locate module locates trace statements in a source code of an application. The collect module collects information regarding the trace statements. The output module outputs the information for use by a user.

24 Claims, 4 Drawing Sheets

U.S. PATENT DOCUMENTS

| | | |
|---|---|---|
| 4,949,300 A | 8/1990 | Christenson et al. |
| 4,979,148 A | 12/1990 | Bush et al. |
| 5,299,315 A | 3/1994 | Chin et al. |
| 5,349,657 A | 9/1994 | Lee |
| 5,388,156 A | 2/1995 | Blackledge, Jr. et al. |
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,638,176 A | 6/1997 | Hobbs et al. |
| 5,640,449 A | 6/1997 | Worley et al. |
| 5,664,228 A | 9/1997 | Mital |
| 5,675,520 A | 10/1997 | Pitt, III et al. |
| 5,706,505 A | 1/1998 | Fraley et al. |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,774,670 A | 6/1998 | Montulli |
| 5,793,982 A | 8/1998 | Shrader et al. |
| 5,812,996 A | 9/1998 | Rubin et al. |
| 5,835,724 A | 11/1998 | Smith |
| 5,855,020 A | 12/1998 | Kirsch |
| 5,878,141 A | 3/1999 | Daly et al. |
| 5,878,282 A | 3/1999 | Mital |
| 5,897,622 A | 4/1999 | Blinn et al. |
| 5,911,068 A | 6/1999 | Zimmerman et al. |
| 5,918,007 A | 6/1999 | Blackledge, Jr. et al. |
| 5,940,075 A | 8/1999 | Mutschler, III et al. |
| 5,940,847 A | 8/1999 | Fein et al. |
| 5,949,300 A | 9/1999 | Christenson et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,983,227 A | 11/1999 | Nazem et al. |
| 5,991,802 A | 11/1999 | Allard et al. |
| 6,006,230 A | 12/1999 | Ludwig et al. |
| 6,014,637 A | 1/2000 | Fell et al. |
| 6,014,666 A | 1/2000 | Helland et al. |
| 6,032,207 A | 2/2000 | Wilson |
| 6,038,551 A | 3/2000 | Barlow et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,607 A | 8/2000 | Bachand et al. |
| 6,108,717 A | 8/2000 | Kimura et al. |
| 6,115,744 A | 9/2000 | Robins |
| 6,121,968 A | 9/2000 | Arcuri et al. |
| 6,138,150 A | 10/2000 | Nichols et al. |
| 6,167,524 A | 12/2000 | Goodnow et al. |
| 6,178,461 B1 | 1/2001 | Chan et al. |
| 6,185,608 B1 | 2/2001 | Hon et al. |
| 6,202,199 B1 * | 3/2001 | Wygodny et al. ........... 717/125 |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan et al. |
| 6,230,313 B1 * | 5/2001 | Callahan et al. ............ 717/128 |
| 6,246,422 B1 | 6/2001 | Emberling et al. |
| 6,247,044 B1 | 6/2001 | Gosling et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,286,133 B1 | 9/2001 | Hopkins |
| 6,326,957 B1 | 12/2001 | Nathan et al. |
| 6,334,157 B1 | 12/2001 | Oppermann et al. |
| 6,343,148 B2 | 1/2002 | Nagy |
| 6,351,767 B1 | 2/2002 | Batchelder et al. |
| 6,353,447 B1 | 3/2002 | Truluck et al. |
| 6,354,477 B1 | 3/2002 | Trummer |
| 6,363,352 B1 | 3/2002 | Dailey et al. |
| 6,370,561 B1 | 4/2002 | Allard et al. |
| 6,373,841 B1 | 4/2002 | Goh et al. |
| 6,397,253 B1 | 5/2002 | Quinlan et al. |
| 6,401,099 B1 | 6/2002 | Koppolu et al. |
| 6,405,241 B2 | 6/2002 | Gosling et al. |
| 6,412,008 B1 | 6/2002 | Fields et al. |
| 6,430,575 B1 | 8/2002 | Dourish et al. |
| 6,460,071 B1 | 10/2002 | Hoffman |
| 6,460,141 B1 | 10/2002 | Olden |
| 6,463,442 B1 | 10/2002 | Bent et al. |
| 6,480,894 B1 | 11/2002 | Courts et al. |
| 6,487,665 B1 | 11/2002 | Andrews et al. |
| 6,505,238 B1 | 1/2003 | Tran |
| 6,539,501 B1 * | 3/2003 | Edwards ..................... 714/45 |
| 6,546,516 B1 | 4/2003 | Wright et al. |
| 6,557,038 B1 | 4/2003 | Becker et al. |
| 6,560,598 B2 | 5/2003 | Delo et al. |
| 6,560,618 B1 | 5/2003 | Ims |
| 6,564,251 B2 | 5/2003 | Katariya et al. |
| 6,591,272 B1 | 7/2003 | Williams |
| 6,606,418 B2 | 8/2003 | Mitchell et al. |
| 6,622,168 B1 | 9/2003 | Datta |
| 6,633,416 B1 | 10/2003 | Benson |
| 6,725,219 B2 | 4/2004 | Nelson et al. |
| 6,728,421 B2 | 4/2004 | Kokemohr |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0083171 A1 | 6/2002 | Hoogenboom et al. |
| 2002/0108102 A1 | 8/2002 | Muhlestein et al. |
| 2002/0188890 A1 | 12/2002 | Shupps et al. |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Gutherie et al. |
| 2003/0025728 A1 | 2/2003 | Ebbo et al. |
| 2003/0028565 A1 | 2/2003 | Landsman et al. |
| 2003/0074634 A1 | 4/2003 | Emmelmann |
| 2003/0097639 A1 | 5/2003 | Niyogi et al. |
| 2004/0003112 A1 | 1/2004 | Alles et al. |
| 2004/0003139 A1 | 1/2004 | Cottrille et al. |
| 2004/0003248 A1 | 1/2004 | Arkhipov |
| 2004/0015879 A1 * | 1/2004 | Pauw et al. ................. 717/127 |
| 2004/0073873 A1 | 4/2004 | Croney et al. |

OTHER PUBLICATIONS

Hovanes, Michael E.; Deal, John R. Grizz; Rowberg, Alan H.; "Seamless Multiresolution Display of Portable Wavelet–Compressed Images" Journal of Digital Imaging, vol. 12, No. 2, suppl 1 (May), 1999, pp 109–111.

Ingham; David B; "W3Objects: A Distributed Object–Oriented Web Server" Object–Oriented Web Servers and data Modeling Workshop, Sixth International World Wide Web Conference, Apr. 7, 1997, Santa Clara, CA 4 pages.

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28–33.

"OOP Launches Hammock at JavaOne" http://www.oop.com/pr2000_06_08.jsp?gui=Plain Jun. 8, 2000, 1 page.

"Hammock: Think of it as Swing for the Web"; Jul. 14, 2000; 10 pages.

Hammond, Eric "Hammock Swings through Web interfaces" www.infoworld.com/articles/mt/xml/00/07/17/000717mthammock.xml; Jul. 14, 2000; 3 pages.

Duan, Nick N.; "Distributed Database Access in a Corporate Environment Using Java" Bell Atlantic Corporation; 1996; 8 pages.

Nadamoto, Akiyo; Kondo, Hiroyuki; Tanaka, Katsumi; "WebCarousel: Restructuring Web Search Results for Passive Viewing in Mobile Environments" IEEE 2001 p. 164–165.

Developing ASP–Based Applications: Microsoft 1996, 5 pages.

"ColdFusion: Web Application Server"; Allair Corp; www.allair.com; 1995–1999.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total–E–Server . . . " Screaming Media, Business Wire; Jun. 5, 2000; 3 pages.

Stewart, Tony; "The Document as Application: Issues and Implications" GCA XML Europe 1999; pp. 575–599.

Franklin, Keith; "Supercharge Data Binding"; Visual Basic Programmer's Journal, Mar. 2000; 7 pages.

Shapiro, Marc; "A Binding Protocol for Distributed Shared Objects" Presented at 14th International Conference on Distributed Comp. Sys.; Jun. 21–24, 1994; 17 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

Marshall, James; "HTTP Made Easy: A Practical Guide to Writing Clients and Servers"; Aug. 15, 1997; 14 pages.

Chapter 3, "Mechanics of Developing JavaScript Applications"; Server–Side Javascript Guide; Online! 1999; pp 51–108 www.developer.netscape.com/docs/mauals/ssjs/1_4/ssjs.pdf.

Chapter 6, "Session Mangement Service"; Server Side Javascript Guide; Online! pp 125–166 www.developer.netscape.com/docs/manuals/ssjs/1_4/ssjs.pdf; 1999.

Anderson, Richard; Homer, Alex; Howard, Rob; Sussman, Dave; "A Preview of Active Server Pages+"; Copyright 2000, Wrox Press, pp. 1–73.

"HTML Encyclopaedia"; http://www.scit.wlv.ac.uk/encyc/form.html; 1995; 2 pages.

"A Brief History of Hypertext" Microsoft Corporation, 1996, 1 page.

European Search Report 01111678.7–2201.

European Search Report 01111680.3–2201.

European Search Report 01111681.1–2201.

European Search Report 01111682.9–2201.

"HTML Encyclopaedia"; http://www.scit.wiv.ac.uk/encyc/form.html; 2 pages.

Custer, Helen; "Inside Windows NT"; Microsoft Press 1993; pp. 74–81.

Davulcu, Hasan; Freire, Juliana; Kifer, Michael; Ramakrishnan, I.V.; "A Layered Architecture for Querying Dynamic Web Content"; ACM 1999; pp. 491–502.

Dowd, Tyson et al., "Compiling Mercury to the .NET Common Language Runtime," Electronic Notes in Theoretical Computer Sciences 59 No. 1 (Netherlands) (2001), pp. 1–16.

Franklin, K., "Supercharge Data Binding," Visual Basic Programmer's Journal, Mar. 2000, Fawcette Technical Publications, vol. 10, No. 3, pp. 32–33, 39–40, 42, 44, 46.

Frost, Jim: "Windows NT Security"; May 4, 1995; 7 pages; http//worldstd.com/-jimf/papers/nt–security/nt–security.html.

Hannay, Phillip et al., "MSIL For the .NET Framework: The Next Battleground?", Virus Bulletin Conference, Sep. 2001, pp. 173–196.

Holmes, John W.; e–Mail response to question regarding GET/POST.HTTP request, extracted from GOOGLE's News Groups, php.general, Nov. 11, 2002.

Kitayama, Fumihiko; Hirose, Shin–Ichi; Kondoh, Goh; Kuse, Kazushi; "Design of a Framework for Dynamic Content Adaptation to Web–Enabled Terminals and Enterprise Applications"; IEEE 1999, pp. 72–79.

Langheinrich, M., et al., "Unintrusive customization techniques for Web advertising," Computer Networks, vol. 31, No. 11–16. May 17, 1999, pp. 1259–1272.

Lee, C.–H., et al., "Web personalization expert with combining collaborative filtering and association rule mining technique," Expert–Systems With Applications, vol. 21, No. 3, Oct. 2001, pp. 131–137.

Li, W.–S., et al., "PowerBookmarks: a system for personalizable Web information organization, sharing, and management, "Computer Networks, vol. 31, No. 11–16, May 17, 1999, pp. 1375–1389.

Mobasher, B., "A Web personalization Engine Based on User Transaction Clustering," Proc. Of the 9th Annual Workshop on Information Tech. And Systems, Dec. 11, 1999, pp. 179–184.

"NCSA httpd" nttpd@ncsa.uiuc.edu.

O'Leary, M., "Web personalization Does It Your Way," O'Leary Online, vol. 23, No. 2, Mar.–Apr. 1999, pp. 79–80.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real–Time ORB's" IEEE Concurrency, 2000, pp. 16–25.

Ramakrishnan, N., "PIPE: Web Personalization by Partial Evaluation," IEEE Internet Computing, vol. 4, No. 6, Nov.–Dec. 2000, pp. 21–31.

Seddon, Bill, "Generating XP Style webparts from a web control," The Code Project–Generating XP style webparts from a web control–ASP.NET, online at http://www.codeproject.com/aspnet/webpartscontrol.asp, retrieved Apr. 8, 2004, 10 pages.

Sells, Chris et al., "Generating Code at Run Time with Reflection.Emit," Windows Developer Magazine, Aug. 2002, vol. 13, No. 8, pp. 26–34.

Shi, Weisong: Collins, Eli, Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310–319.

Syme, Don, "ILX: Extending the .NET Common IL for Functional Language Interoperability," Electronic Notes in Theoretical Computer Science 59 No. 1 (2001), pp. 1–20.

Varela, Carlos A.; Caroline C. Hayes; "Providing Data on the Web; From Examples to Programs," Second International WWW Conference, Chicago, IL; Oct. 17, 1994; 17 pages.

* cited by examiner

METHOD AND SYSTEM FOR TRACING

TECHNICAL FIELD

The present invention relates to application development and more particularly to collecting and outputting runtime information for software applications running on a computing system.

BACKGROUND

Developing software applications can be difficult. Typically, the development process results in errors during compilation that must be debugged before the final program is complete. Debugging these errors can be complex and difficult, especially as the software application becomes more complex. Inadequate debugging tools and/or weak instrumentation data often compound this difficulty. In addition, complex applications demand optimization to conserve memory, processing time, or other overhead considerations. Therefore, improvements are desirable.

SUMMARY

In accordance with the present invention, the above and other problems are solved by the following:

In one aspect of the present invention, a method of collecting runtime information for an application in a computing system is described. The method includes locating trace statements in a source code of the application, collecting information regarding the trace statements, and outputting the information for use by a user.

In another aspect of the present invention, a system for collecting runtime information for an application in a computing system is described. The system includes a locate module, a collect module, and an output module. The locate module locates trace statements in a source code of an application. The collect module collects information regarding the trace statements. The output module outputs the information for use by a user.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods, systems, and an article of manufacture containing the methods for tracing in a software application on a computing system. Trace statements can be inserted throughout the source code. The trace function can be enabled or disabled. When enabled, the trace system will track information about the trace statements, cookie information, header information, form variables, query strings, application state objects, session state objects, control tree, and server variables. When disabled, the trace statements are ignored at run time. The collected information can be output to the bottom of the page rendered or to a separate application.

This type of debugging structure provides cross-language debugging support that can be used both locally and remotely from a web server. The trace capability enables both controls and page developers to append instrumentation messages through their source code. These instrumentation messages can be used to simplify the process of identifying what occurs during a given web request and help track down resulting problems.

This process has numerous advantages. One such advantage is that the tracing function provides a secure, accessible means for collecting and viewing runtime information about an application that developers can use to monitor request execution. Another such advantage is that this function provides a general mechanism for outputting debug statements during request execution, to a trace viewer application or to the browser window.

Figure 1:
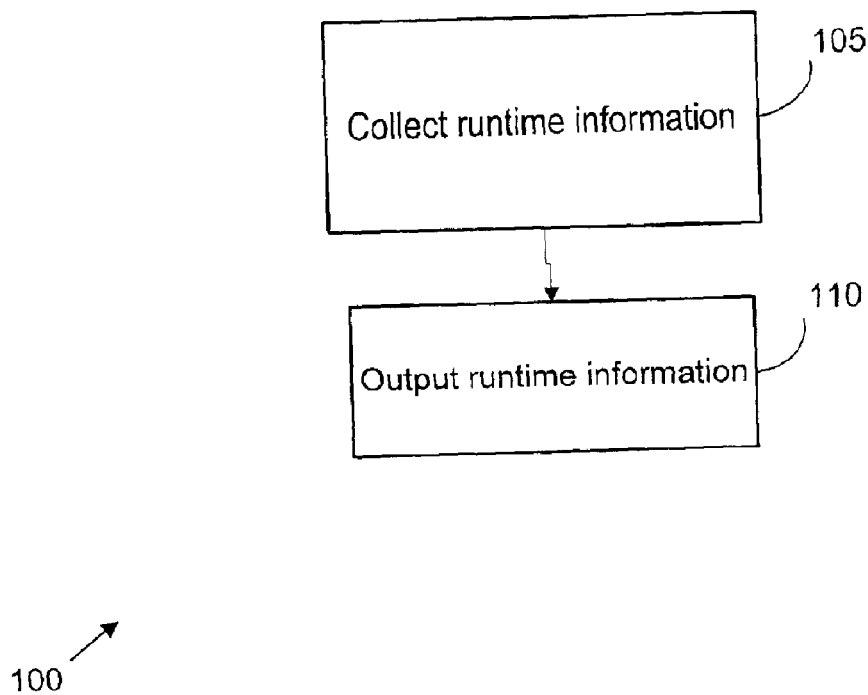
FIG. 1 is a schematic representation of methods and systems for a trace system, according to an exemplary embodiment of the present invention.

Referring now to FIG. 1, a schematic representation of a trace system 100 is illustrated. At block 105, the trace system 100 collects runtime information. This information can include, for example, when did a runtime request occur, what was the status code, and what was the request type. At block 110, the trace system 100 outputs the runtime information, for example, for viewing. This information can be output to a trace viewer application or to a browser window. Thus a developer or administrator can monitor the execution of an application, noting such items as time and resources used. In addition, a developer can find errors and debug the application.

Figure 2:
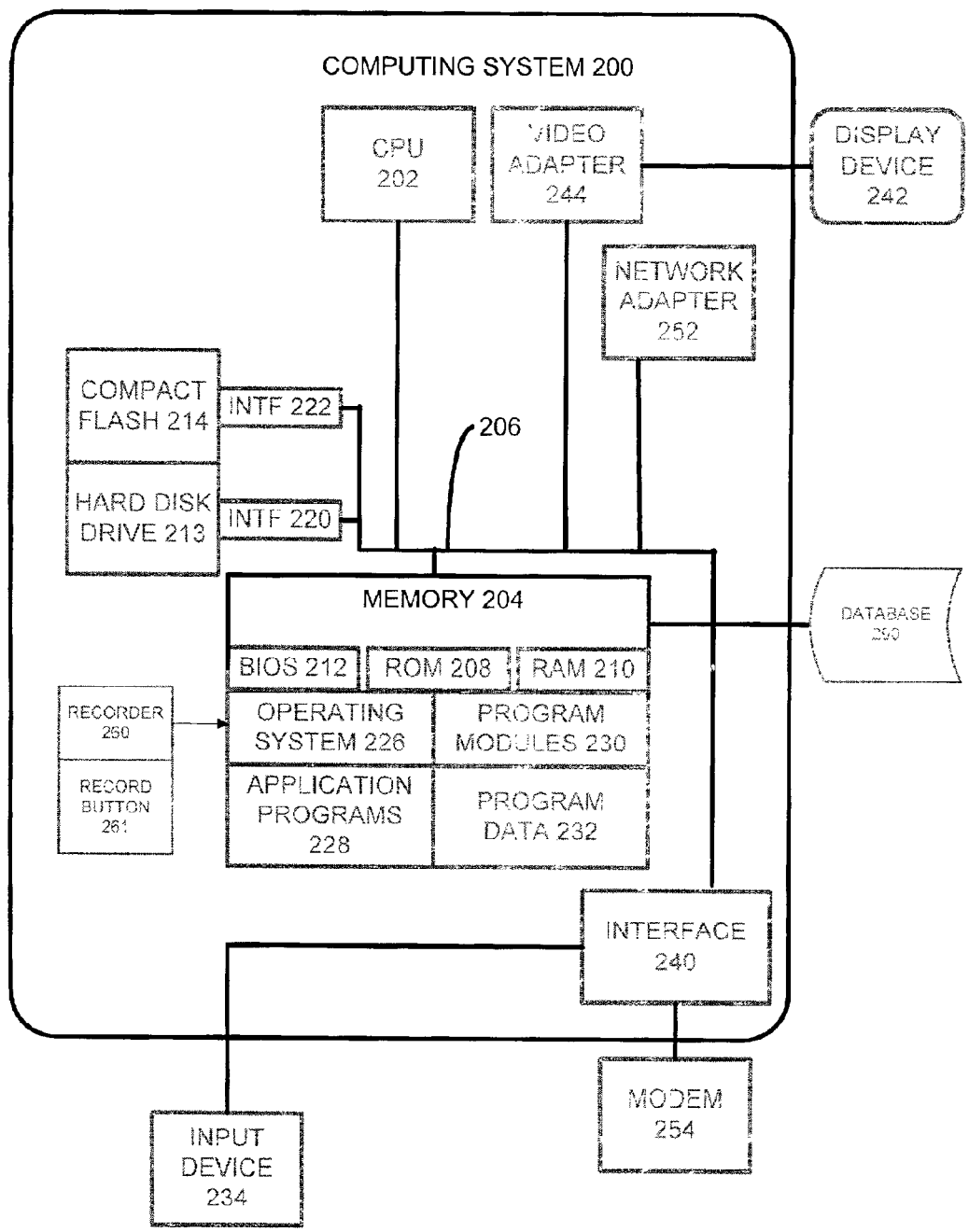
FIG. 2 is a schematic representation of a computing system that may be used to implement aspects of the present invention.

FIG. 2 and the following discussion are intended to provide a brief, general description of a suitable computing environment in which the invention might be implemented. Although not required, the invention is described in the general context of computer-executable instructions, such as program modules, being executed by a computing system. Generally, program modules include routines, programs, objects, components, data structures, etc. that perform particular tasks or implement particular abstract data types.

Those skilled in the art will appreciate that the invention might be practiced with other computer system configurations, including handheld devices, palm devices, multiprocessor systems, microprocessor-based or programmable consumer electronics, network personal computers, minicomputers, mainframe computers, and the like. The invention might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present invention includes a general purpose-computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller, a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage is device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
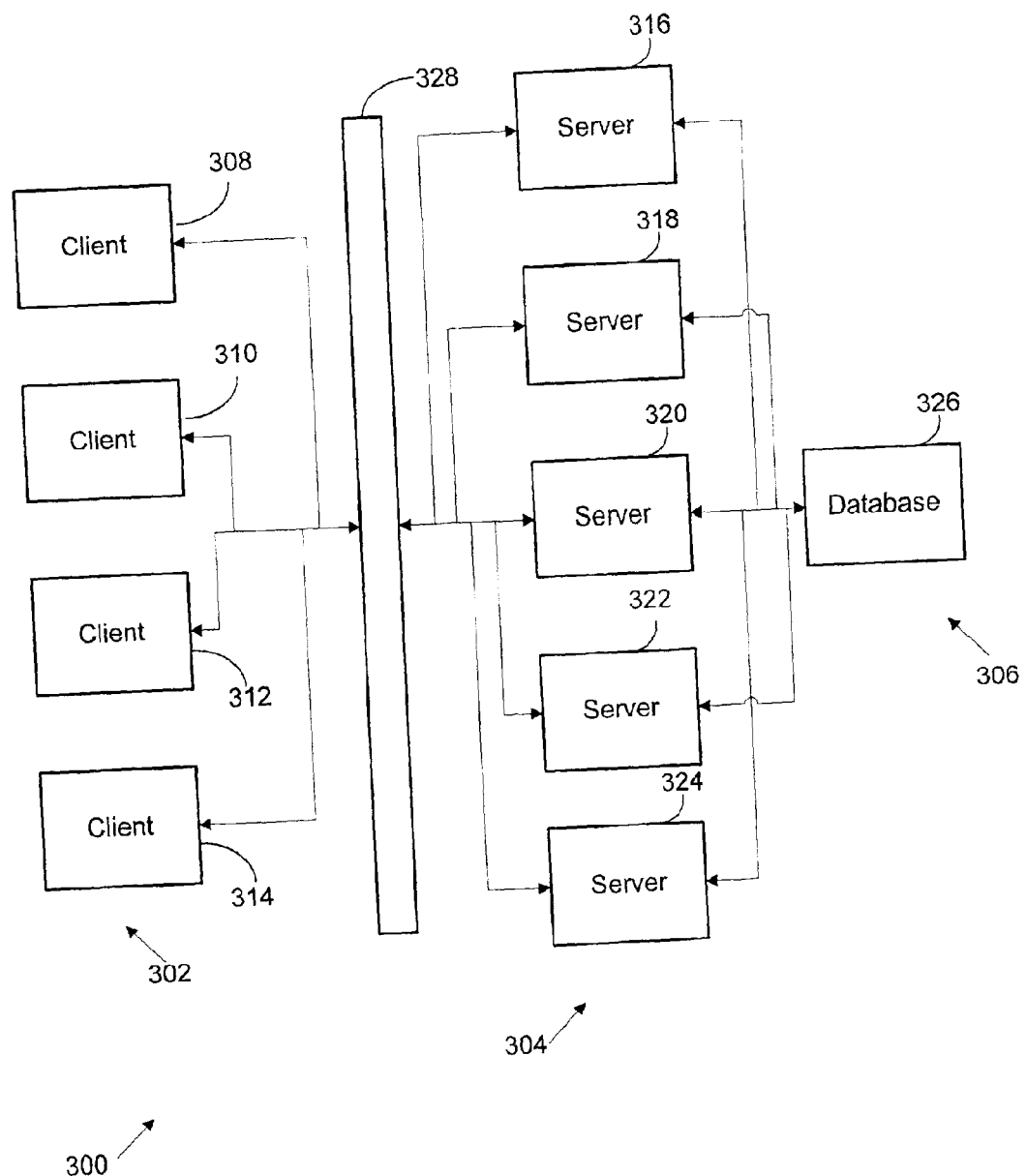
FIG. 3 is a schematic representation of a server computing arrangement that may be used to implement aspects of the present invention.

Referring now to FIG. 3, an exemplary environment 300 for implementing embodiments of the present invention includes a multi-tier architecture comprising a client tier 302, a server tier 304, and a database tier 306. This multi-tier architecture is common, for example, in applications related to the World Wide Web or Internet. The client tier 302, the server tier 304, and the database tier 306 might contain any number of computing systems, for example, the computing system 200 as described in connection with FIG. 2. In the embodiment illustrated in FIG. 3, the client tier 302 includes a plurality of client computing systems 308, 310, 312, 314.

Likewise, the server tier 304 includes a plurality of server computing systems 316, 318, 320, 322, 324. The database tier 306 includes a database 326. Of course, the database tier 306 could also contain multiple databases. This exemplary environment is commonly referred to as a three-tier architecture.

In this three-tier architecture, the database tier 306 is the ultimate repository of information or data. The client tier 302 provides the user-interface logic for interfacing with a user of the three-tier architecture. The server tier 304 typically contains the business rules and controls the interface between the client tier 302 and the database tier 306. The client tier 302 typically interacts with the server tier 304, which in turn interacts with the database tier 306 to update the database 326 and retrieve data from the database.

Many users can interface with the server tier 304 simultaneously through a router 328. As stated previously, the client tier 302 might contain several, thousands, or millions of client computing systems 308, 310, 312, 314, for example a web browser or a rich client. All of these computing systems 308, 310, 312, 314 interact with the router 328 sending requests to the server tier 304 for information and receiving information back from the server tier 304. For example, the client computing system 308 might request a list of books for sale from the server tier 304. The client computing system 308 sends the request to the router 328. The router 328 routes the request to a server computing system, such as the server computing system 316, for example a web server or network server. The router 328 might be a dumb router or a smart router as is commonly known. Preferably, the router 328 routes the client requests based on load. In other words, the router 328 determines which server computing system 316, 318, 320, 322, 324 in the server tier 304 has the most capacity available at the time of the request and accordingly routes the request.

The server computing system 316 receives the request from the client computing system 308, through the router 328, and accesses the database 326 to retrieve the requested information. The database 326 sends the requested information to the server computing system 316. The server computing system 316 processes or formats the information and returns the resulting information to the client computing system 308 through the router 328 for use by the user. As the number of requests to the server tier 304 increases, more server computing systems can be added to the server tier 304. Thus, the multi-tier architecture is scalable.

Figure 4:
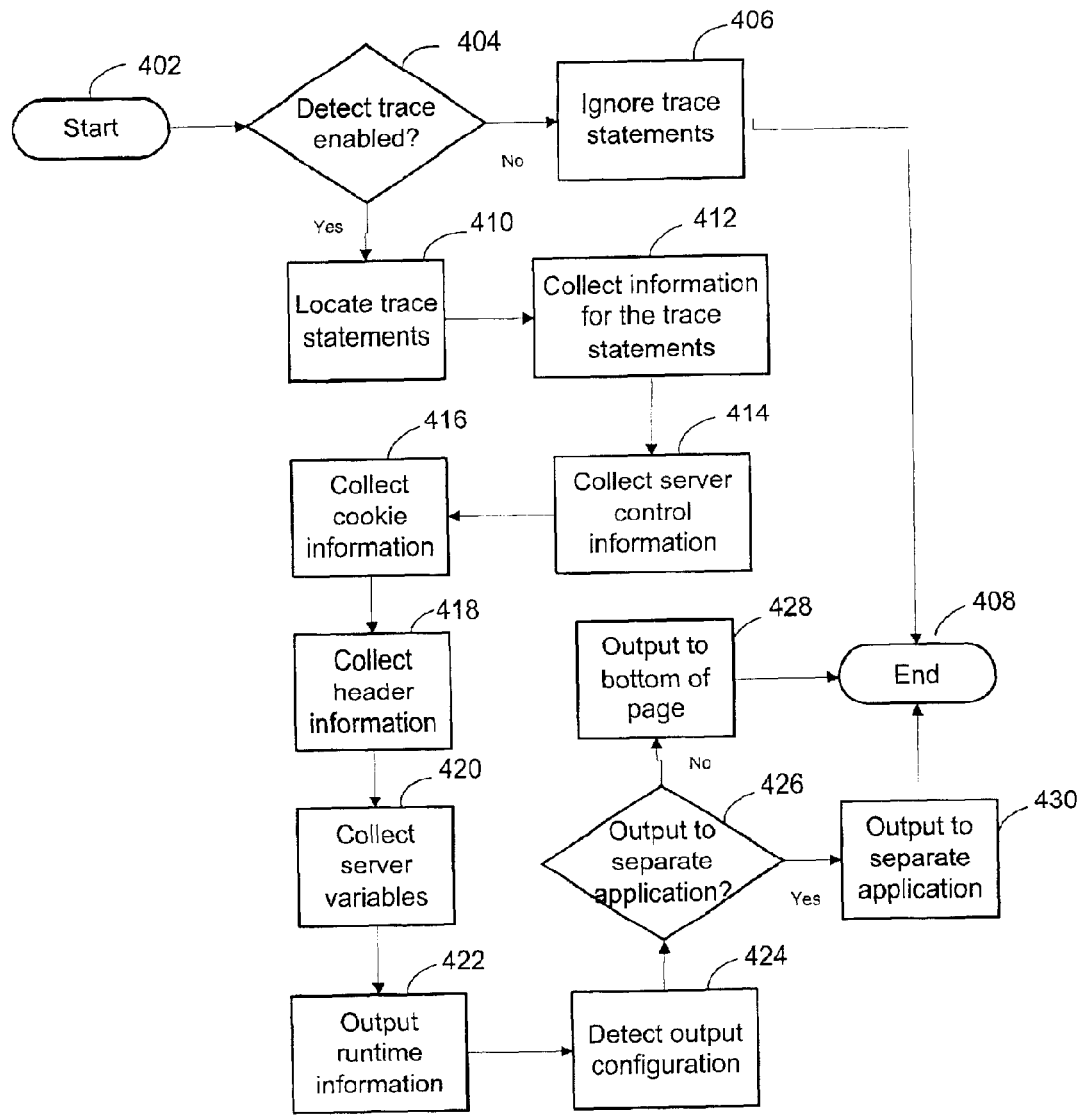
FIG. 4 is a flow chart illustrating the logical operations of a tracing system that may be used to implement aspects of the present invention.

FIG. 4 is a flow chart illustrating the logical operations of a tracing system 400. Operation flow begins at a start position 402. A detect module 404 detects if a tracing function is enabled. Preferably, the tracing function is enabled by a user, such as a developer or administrator, by turning the tracing function on within the source code itself.

Typically, by default the trace function is not enabled on a page, such that the "Trace.IsEnabled" variable will return false. It is noted that the trace function can be enabled and disabled at any point within the source code. Thus, if a user wanted trace information for only a portion of the application, the above syntax can be inserted at the point in the source code that the user wants to begin tracing. The following syntax can be inserted at the point in the source code that the user wants to stop tracing:

"Trace.IsEnabled=false"

If the detect module 404 detects that the trace function is not enabled, operational flow branches "NO" to the ignore operation 406. The ignore operation 406 ignores the trace statements and no messages will be output during a web request. Ignoring the trace statements saves system performance. Operational flow proceeds to termination point 408 where operational flow ends.

If the detect module 404 detects that the trace function is enabled, or, in other words, that a true value is returned for the "Trace.IsEnabled" variable, operational flow branches "YES" to a locate operation 410. The locate operation 410 locates the trace statements within the source code that occurred during a web request. Preferably, these trace statements are placed in the source code by a user. The trace property is exposed in the HttpContext for a request. The trace property is also available directly from the Page class. The trace statements can be organized using a "category" string. For example, the following is a sample page containing a trace statement:

```
<html>
    <script runat=server>
        Sub Page_Load(ByVal Sender as Object, ByVal E as EventArgs)
            Trace.Write("Merchant", "Customer State is CA")
        End Sub
    </script>
    <body>
        <form runat=server>
            <span id="Message" runat=server/>
        </form>
    </body>
</html>
```

Preferably, trace messages can be organized by using a "tracemode" attribute exposed on the page directive. A value of "SortByTime" will cause the trace messages to be output in the order in which they were written. A value of "SortByCategory" will cause the trace messages to be output alphabetically by category.

A collect operation 412 collects runtime information for the trace statements. Such runtime information might include when did the request occur; what was the http status code; and what was the request type, i.e., get, or a post request.

A control operation 414 collects server control information, or the tree of controls for a page. For example, the page might contain a form that contains a text box and a button. The following is an example control using tracing:

```
public class MyButton: Control {
    public override void Render (HTML TextWriter output) {
        Trace.Write("Render","Button class is about to render . . . ");
        output.Write("<button>Simple Button</button>);
        Trace.Write("Render","Button class has just finished rendering . . . ");
    }
}
```

This server control information allows the developer to see what the application is doing. This is useful in debugging an application. Likewise, a cookie operation 416 will collect cookie information. A header operation 418 will collect header information. A variable operation 420 will collect information about variables.

An output operation 422 will output all of the runtime information, including the information collected by the collect operation 412, the control operation 414, the cookie operation 416, the header operation 418, and the variable operation 420, for use by the user. A find operation 424 finds an output configuration. An output module 426 detects whether the output configuration dictates output to a separate application. If the output module 426 determines that the output configuration does not dictate output to a separate application, operational flow branches "NO" to the page operation 428. The page operation 428 outputs the information collected by the output operation 422 to the bottom of the page being rendered. Preferably, displaying the output to the bottom of the page is the default display mode. Thus, the Page class will automatically output an HTML table at the conclusion of page rendering that details all of the assorted category trace logs. For example:

```
<html>
    <body>
        <form runat=server>
            <span id="Message" runat=server/>
        <form>
    </body>
</html>
<table>
    <tr>
        <td colspan=2><h1>Trace Log</h1></td>
    </tr>
    <tr>
        <td><h3>Merchant</h3></td>
        <td>Customer State is CA </td>
    </tr>
    <tr>
        <td><h3>Render Category</h3></td>
        <td>
            Button class is about to render . . . <br>
            Button class has just finished rendering . . .
        </td>
    </tr>
</table>
```

Operational flow terminates at termination point 408.

If the output module 426 determines that the output configuration does dictate output to a separate application, operational flow branches "YES" to a separate operation 430. The separate operation 430 directs the output to a separate application. Of course, the tracing system 400 might also check for enablement of output to the bottom of the page as described above after outputting to a separate application. Outputting the runtime information to a separate application has advantages. One such advantage is that the application can be run without the user, who is running the application, seeing the output while a separate user views the output information. Operational flow terminates at termination point 408.

The operational flow chart depicted in FIG. 4 may best be understood in terms of application examples. Referring to FIG. 4., in a first application example, operational flow begins at start point 402. A developer has inserted numerous trace statements throughout the source code, but has not enabled the trace function. The detect module 404 detects that the trace function is not enabled, and operational flow branches "NO" to the ignore operation 406. The ignore operation 406 ignores the trace statements during compilation, and operational flow ends at termination point 408.

In another application example, the developer has enabled the trace function. The detect module 404 detects that the trace function is enabled, and operational flow branches "YES" to the locate operation 410. The locate operation 410 locates the trace statements. The collection operation 412 collects information for the trace statements. The control operation 414 collect server control operation. The cookie operation 416 collects cookie information. The header operation 418 collects header information. The server operation 420 collects server information.

The output operation 422 outputs the runtime information collected by the collection operation 412, the control operation 414, the cookie operation 416, header operation 418, and the server operation 420. The detect operation 424 detects that the output configuration for outputting the runtime information is to the bottom of the page being rendered. The output module 426 detects that the output is not to a separate application, and operational branches "NO" to the page operation 428. Operational flow ends at termination point 408.

In another application example, operational flow proceeds as described above to the detect operation 424. The detect operation 424 detects that the output configuration dictates outputting to a separate application. The output module 426 detects outputting to a separate application, and operational flow branches "YES" to the separate operation 430. The separate operation 430 outputs the runtime information to a separate application. Operational flow ends at termination point 408.

The logical operations of the various embodiments illustrated herein are is implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of collecting runtime information for an application in a computing system, the method comprising:

locating trace statements in a source code of the application;

collecting information regarding the trace statements;

outputting the information for use by a user; and detecting if the information should be output to a separate application;

if the output should not be to a separate application then outputting the information to a bottom of a page for viewing by a user; and if the output should be to a separate application then outputting the information to the separate application.

2. A method according to claim 1 further comprising:

before locating trace statements, detecting if a trace function is enabled.

3. A method according to claim 2 further comprising:

detecting if a trace function is enabled includes if the trace function is enabled:

locating trace statements in a source code of the application;

collecting information regarding the trace statements;

outputting the information for viewing by a user; and and if the trace function is not enabled:

ignoring the trace statements.

4. A method according to claim 1 wherein:
outputting includes organizing the information according to predefined organizational attributes.

5. A method according to claim 1 further comprising:
collecting server control information;
collecting cookie information;
collecting header information; and
collecting server variable information.

6. A method according to claim 1 wherein:
outputting the information includes outputting the information to a bottom of a page for viewing by a user.

7. A method according to claim 1 wherein:
outputting the information to the separate application includes outputting the information to a separate web page.

8. A method according to claim 1 wherein:
collecting information includes collecting a request occurrence time, an http status code, and a request type.

9. A system for collecting runtime information for an application in a computing system, the system comprising:
a locate module that locates trace statements in a source code of the application;
a collect module that collects information regarding the trace statements;
an output module that outputs the information by use by a user;
a detect module that detects if the information should be output to a separate application; and
a separate module that outputs the information to the separate application.

10. A system according to claim 9 further comprising:
a detect module that detects if a trace function is enabled.

11. A system according to claim 10 further comprising:
a compile operation that ignores the trace statements.

12. A system according to claim 9 wherein:
the output module organizes the information according to predefined organizational attributes.

13. A system according to claim 9 further comprising:
a server module that collects server control information;
a cookie module that collects cookie information;
a header module that collects header information; and
a server module that collects server variable information.

14. A system according to claim 9 further comprising:
a page module that outputs the information to a bottom of a page for viewing by a user.

15. A system according to claim 9 wherein:
the separate module outputs the information to a separate web page.

16. A system according to claim 9 wherein:
the collection module collects a request occurrence time, an http status code, and a request type.

17. A computer program product readable by a computing system and encoding instructions for a computer process for collecting runtime information for an application in a computing system, the computer process comprising:
locating trace statements in a source code of the application;
collecting information regarding the trace statements;
outputting the information for use by a user; and
detecting if the information should be output to a separate application;
if the output should not be to a separate application then outputting the information to a bottom of a page for viewing by a user; and
if the output should be to a separate application then outputting the information to the separate application.

18. A computer process according to claim 17 further comprising:
before locating trace statements, detecting if a trace function is enabled.

19. A computer process according to claim 18 further comprising:
detecting if a trace function is enabled includes if the trace function is enabled:
locating trace statements in a source code of the application;
collecting information regarding the trace statements;
outputting the information for viewing by a user; and
and if the trace function is not enabled:
ignoring the trace statements.

20. A computer process according to claim 17 wherein:
outputting includes organizing the information according to predefined organizational attributes.

21. A computer process according to claim 17 further comprising:
collecting server control information;
collecting cookie information;
collecting header information; and
collecting server variable information.

22. A computer process according to claim 17 wherein:
outputting the information includes outputting the information to a bottom of a page for viewing by a user.

23. A computer process according to claim 17 wherein:
outputting the information to the separate application includes outputting the information to a separate web page.

24. A computer process according to claim 17 wherein:
collecting information includes collecting a request occurrence time, an http status code, and a request type.

* * * * *

UNITED STATES PATENT AND TRADEMARK OFFICE
CERTIFICATE OF CORRECTION

PATENT NO. : 6,944,797 B1
APPLICATION NO. : 09/876689
DATED : September 13, 2005
INVENTOR(S) : Scott D. Guthrie et al.

It is certified that error appears in the above-identified patent and that said Letters Patent is hereby corrected as shown below:

On the title page, item (56), under "Other Publications", in column 2, line 3, after "Thomas" delete ":" and insert -- ; --, therefor.

On page 2, item (56), under "Other Publications", in column 2, line 11, delete "Netorking" and insert -- Networking --, therefor.

On page 3, item (56), under "Other Publications", in column 1, line 30, after "Made" insert -- Really --.

On page 3, item (56), under "Other Publications", in column 1, line 34, delete "mauals" and insert -- manuals --, therefor.

On page 3, item (56), under "Other Publications", in column 1, line 50, delete "wiv" and insert -- wlv --, therefor.

On page 3, item (56), under "Other Publications", in column 2, line 2, delete "http//worldstd" and insert -- http://world.std --, therefor.

On page 3, item (56), under "Other Publications", in column 2, line 18, delete "Expert-Systems" and insert -- Expert Systems --, therefor.

On page 3, item (56), under "Other Publications", in column 2, line 28, delete "®" and insert -- @ --, therefor.

On page 3, item (56), under "Other Publications", in column 2, line 33, delete "Priciple" and insert -- Principle --, therefor.

On page 3, item (56), under "Other Publications", in column 2, line 46, after "Eli" delete "," and insert -- ; --, therefor.

In column 3, line 20, after "controller" delete "," and insert -- ; --, therefor.

In column 3, line 29, after "storage" delete "is".

In column 8, line 21, after "are" delete "is".

UNITED STATES PATENT AND TRADEMARK OFFICE
CERTIFICATE OF CORRECTION

PATENT NO.         : 6,944,797 B1
APPLICATION NO. : 09/876689
DATED                : September 13, 2005
INVENTOR(S)       : Scott D. Guthrie et al.

It is certified that error appears in the above-identified patent and that said Letters Patent is hereby corrected as shown below:

In column 9, line 27, in Claim 9, after "information" delete "by" and insert -- for --, therefor.

In column 10, line 32, in Claim 19, delete "and" before "if".

Signed and Sealed this

First Day of September, 2009

David J. Kappos
*Director of the United States Patent and Trademark Office*